US008003280B1

(12) United States Patent
Marshall (10) Patent No.: US 8,003,280 B1
(45) Date of Patent: Aug. 23, 2011

(54) SYSTEM AND METHOD FOR HOLOGRAPHIC LITHOGRAPHIC PRODUCTION OF A PHOTONIC CRYSTAL

(76) Inventor: Robert Andrew Marshall, Georgetown, TX (US)

( * ) Notice: Subject to any disclaimer, the term of this patent is extended or adjusted under 35 U.S.C. 154(b) by 920 days.

(21) Appl. No.: 11/873,413

(22) Filed: Oct. 17, 2007

(51) Int. Cl.
G03H 1/02 (2006.01)
(52) U.S. Cl. .................................. 430/1; 430/2; 359/35
(58) Field of Classification Search ........................ None
See application file for complete search history.

(56) References Cited

U.S. PATENT DOCUMENTS

| | | | | |
|---|---|---|---|---|
| 4,842,405 | A * | 6/1989 | El-Sherif | 385/37 |
| 5,023,463 | A * | 6/1991 | Boardman et al. | 250/551 |
| 6,075,915 | A * | 6/2000 | Koops et al. | 385/125 |
| 6,284,437 | B1 * | 9/2001 | Kashyap | 430/321 |
| 6,404,956 | B1 * | 6/2002 | Brennan et al. | 385/37 |
| 6,869,330 | B2 * | 3/2005 | Gee et al. | 445/50 |
| 6,991,891 | B1 * | 1/2006 | Laming et al. | 430/321 |
| 7,085,038 | B1 * | 8/2006 | Etheridge et al. | 359/321 |
| 2002/0025117 | A1 * | 2/2002 | Ishii et al. | 385/37 |
| 2003/0124438 | A1 * | 7/2003 | Stepanov et al. | 430/2 |
| 2003/0213768 | A1 * | 11/2003 | Koeda et al. | 216/24 |
| 2006/0071585 | A1 | 4/2006 | Wang | |
| 2006/0210233 | A1 | 9/2006 | Yeo | |
| 2007/0018077 | A1 * | 1/2007 | Puscasu et al. | 250/210 |
| 2007/0289119 | A1 * | 12/2007 | Lee et al. | 29/592.1 |
| 2009/0160303 | A1 * | 6/2009 | Marshall | 313/113 |

FOREIGN PATENT DOCUMENTS

CN 100999380 * 7/2007

OTHER PUBLICATIONS

Knight et al. "All-silica single mode optical fiber with photonic crystal cladding" Opt. Lett., vol. 21(19) pp. 1547-1549 (Oct. 1996).*
Li et al. "superprism phenomenon based on holographic polymer dispersed liquid crystal films", Appl. Phys. Lett., vol. 88 (9), pp. 091109-1 to 091109-3 (Feb. 2006).*
Turberfield, Photonic Crystals made by Holographic Lithography, MRS Bull. pp. 632-636 (Aug. 2001).*
Roberts et al. "Ultimate low loss of hollow-core photonic crystal fibers", Opt. Exp. vol. 13(1) pp. 236-244 (Jan. 2005).*
Vekris et al. Buried linear extrinsic defects in colloidal photonic crystals, Adv. Mater. vol. 17 pp. 1269-1272 (2005).*
Schmidt et al. "hollow core waveguides and 2-D waveguide arrays . . . ", IEEE J Sel. Top. Quant. Electron., vol. 11(2) pp. 519-527 (Mar. 2005).*
Lin et el. Three dimensional photonic emitter for thermal voltaic power generation, Appl. Phys. Lett., vol. 83(2) pp. 380-382 (Jul. 2003).*
Braun et al. "Introducing defects in 3D photonic crystals: state of the art", Adv. Mater. vol. 18 pp. 2665-2678 (2006).*

* cited by examiner

Primary Examiner — Martin J Angebranndt (57) ABSTRACT

A system and method for holographic lithography is disclosed, including interferometeric alignment of laser sources. This includes creation of the volumetric holographic pattern around wire and other planar and non-planar substrates. This template is further processed into devices for various applications including Photonic Crystals, Photonic Band Gaps, Photonic Band Gaps with selective defects, and Photonic Band Gap incandescent emitters.

26 Claims, 5 Drawing Sheets

SYSTEM AND METHOD FOR HOLOGRAPHIC LITHOGRAPHIC PRODUCTION OF A PHOTONIC CRYSTAL

TECHNICAL FIELD OF THE INVENTION

This invention relates to the field of holography and to the field of Photonic Crystals, more specifically: to a system and method to fabricate Photonic Crystals by holographic lithography, to precision laser alignment, and to a high efficacy Photonic Crystal light source.

BACKGROUND OF THE INVENTION

A Photonic Crystal (PC) is a defined as a porous dielectric composite structure with modulated refractive indices, which control the interaction of light and matter. This interaction is dependent on both the geometry of the crystal as well as the materials parameters. For a Photonic Band Gap (PBG) to exist within a PC, the allowed photonic bands must not overlap for some area, this area is defined as the band gap. A complete 3-D PBG is a gap in the allowed quantum states across all propagation directions and polarization modes. The band gap position and gap width may be easily modified to yield desired photonic properties by varying crystal parameters, such as: structural geometry, crystal lattice dimensions, or contrast of indices of refraction between the composite material and vacuum/air. The ability of a band gap with selected defects to tightly control the propagation of light is attractive for optical waveguides, optical signal processing, telecommunications, superlenses, sensors, and many other applications. The ability to modify the band structure, thus modify the density of states, and thus the thermal emission spectra of a PC material, makes PCs attractive for lighting and ThermoPhotoVoltaic (TPV) applications.

Many 3D PC structures exhibit PBG properties, including: inverse opal, woodpile, diamond, Rod Connected Diamond (RCD), gyroid, and others. PBG devices are typically formed from a template and then inverted one or more times to result in the desired geometry and material composition. Layer by layer manufacturing of 3D PBG structures is expensive and time consuming, especially for structures with fine pitch lattice constants for visible applications. Colloidal self-assembly methods are sensitive to defects, which destroy the band gap.

Holographic lithography offers a method to create an entire 3D template that is many lattice constants thick in a single or multiple volumetric exposures. It is suited to a low number of defects and can produce the lattice constants necessary for a visible band gap. Unfortunately, more complex structures, such as the RCD, are defined by the interference of 7 laser beams, projected into a 3 dimensional space. Thus, the optical setup is very sensitive to phase, polarization, amplitude, and positional variations of the laser sources. Therefore, even thermal drift and vibration can result in the formation of an undesired structure since the projected dimensionality shifts, not just the position. Even simpler structures such as the fcc lattice require more than 3 beams, and are thus phase sensitive. Also, when applied to opaque substrates, all beams must originate from the same side of the substrate. Thus a need has arisen to precisely maintain alignment between multiple lasers in a complex 3D configuration.

Physics requires that all objects emit light, with variations in power level and spectra, depending on the material composition and temperature. Quantum Electro Dynamics requires materials with a shaped availability of quantum photonic states produce a shaped emission spectra, relative to that of a black body.

Holographic lithography promises a low cost, high quality opportunity to template PBGs for lighting applications. However, wire filaments are preferred for lighting applications due to their ease of packaging and compatibility with existing bulb manufacturing infrastructure. Convex surfaces are preferred for TPV applications. Current methods are not suited to non-planar substrates or exposure from both sides of the substrate. Thus a need has arisen to template irregular substrates.

The holographic laser sources are index matched with a prism to the photoresist to limit unwanted distortions from reflected beams. Complex multi-beam prisms mating to non-planar substrates are costly. Thus a need for low cost beam delivery has arisen.

A variety of methods to transform a PC template into a PBG are well known, including electrodeposition, Chemical Vapor Deposition (CVD), and other micromoulding methods.

SUMMARY OF THE INVENTION

A system and method to fabricate Photonic Crystals by holographic lithography; precision laser alignment; and a high efficacy Photonic Crystal light source are disclosed. A volumetric holographic pattern of a RCD, gyroid, or other PC structure is produced on a wire substrate. Also, defects may be introduced into a holographic template.

Well-known holographic techniques are not suitable for double-sided substrates, as a laser beam only illuminates one side of a substrate. Instead, a pair of lasers is positioned in phase along each holographic axis to illuminate both sides of a wire. The corresponding lasers within each pair are directly coupled to each other, forming an extended laser cavity. Slight variations in the distance between the lasers of any pair results in destructive interference. This variation is compensated for with an interferometer including a closed loop control system for maximizing beam power, with a back facet photodiode to measure beam power, and a piezoelectric actuator moving each laser symmetrically within its pair.

The RCD is a 7 beam projection into a 3D space, thus phase alignment between the beams is critical. Well-known techniques are suited to a lab environment where the temperature is stable, long term drift is not relevant, the number of beams is generally limited to 4, and setup time is not a concern. The reflectance spectra of developed holographs are measured along multiple crystallographic axes and analyzed for desired adjustments. Phase adjustments are actuated with the same actuators used for cavity length control, but offset the cavity without changing its length. Amplitude, polarization, and direction adjustments may also be made. Test coupons may be used for initial alignment. The difficulty of keeping 7 pairs of coupled lasers aligned with nanometer precision for long periods of time under manufacturing conditions is now overcome.

The beams are index matched to the photoresist to limit poor imaging due to reflections. A volume of oil eliminates the need for a complex prism.

For a PBG, a holographic template is further inverted and then inverted again with a high dielectric material. The holographic template may be used as a substrate with which to produce advanced structures, such as optical waveguides, filters, couplers, and splitters.

For a light emitter, a holographic image is created in a photoresist on a coiled wire substrate. The developed template is processed into a PBG and then covered in a thin evaporation barrier. This PBG filament is placed in a standard Edison, fluorescent, or HID light bulb package and resistively heated to emit light. The resultant thermally stimulated emissions are highly spectrally shaped, leading to high efficacy lighting, yet maintaining a low purchase price, non-toxic composition, and a socket compatibility with existing incandescents. Multiple holographic exposures are made along the length of the wire. Each exposure may have a differing lattice constant to improve the color rendering index of the bulb.

For optical signal processing applications, the holographic template may be used as a scaffold on which to selectively introduce defects. For positive defects, a scanning laser selectively hardens an additional small volume of photoresist. For negative defects, the structure may be inverted, then infiltrated with a 2 photon photoresist, with a laser scanning of the desired defect pattern.

Additional applications include TPV electric generation; LED light extraction; thermal signature modification; filters; prisms; lenses; lasers; chemical and mechanical functions including: strain gauges, chemical sensors, temperature sensors, chemical separation processes, gas storage, colorants, water repellants, and catalytic supports; biological scaffolds; lightweight structural materials; thermal and acoustic insulators; electronic displays including: arrays of light emitters or electrically-tunable filters; photonic papers, re-printable papers, and synthetic gemstones.

BRIEF DESCRIPTION OF THE DRAWINGS

For a more complete understanding of the invention, and for further features and advantages, reference is now made to the following detailed description, taken in conjunction with the accompanying drawings, in which.

DETAILED DESCRIPTION OF EMBODIMENTS OF THE INVENTION

Embodiments of the present invention and their advantages are best understood by referring to FIGS. 1 through 4 of the drawings, in which like numerals refer to like parts.

Figure 1:
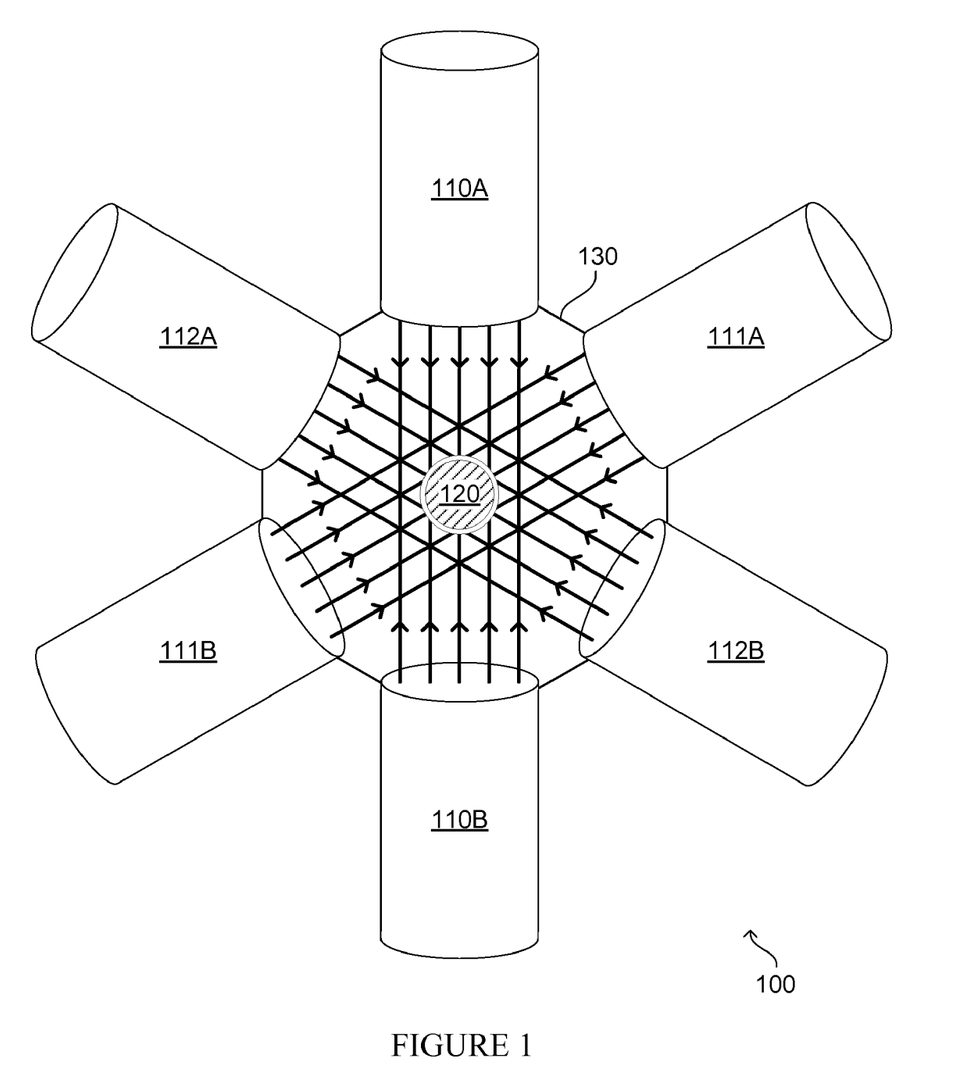
FIG. 1 is a diagram illustrating one embodiment of a double-sided holographic exposure cell.

FIG. 1 is a diagram illustrating one embodiment of a double-sided holographic exposure cell. Holographic cell 100 employs a multitude of laser pairs 110A/B thru 116A/B to produce a holographic interference pattern in a volume surrounding wire 120. Only 3 pairs of lasers are shown for illustrative purposes and are not in plane with each other. More desirable advanced structures, such as the RCD, require 7 laser pairs. The holographic interference pattern may alternatively be selected as a gyroid, fcc, inverse RCD, or any other selected lattice structure by changing the intensity, phase, direction, and number of laser pairs 110. Before exposure, wire 120 is dip-coated with a layer of photoresist, which will capture the interference pattern. SU8 is one of many preferred photoresists, as its index of refraction does not change with exposure and it provides sufficient resolution. An index matching prism 130 minimizes reflections between the lasers and the photoresist. Prism 130 must be a complex 3D shape in order to match 14 lasers to a cylindrical substrate. A small amount of index matching oil is required to interface the photoresist to the prism.

Figure 1A:
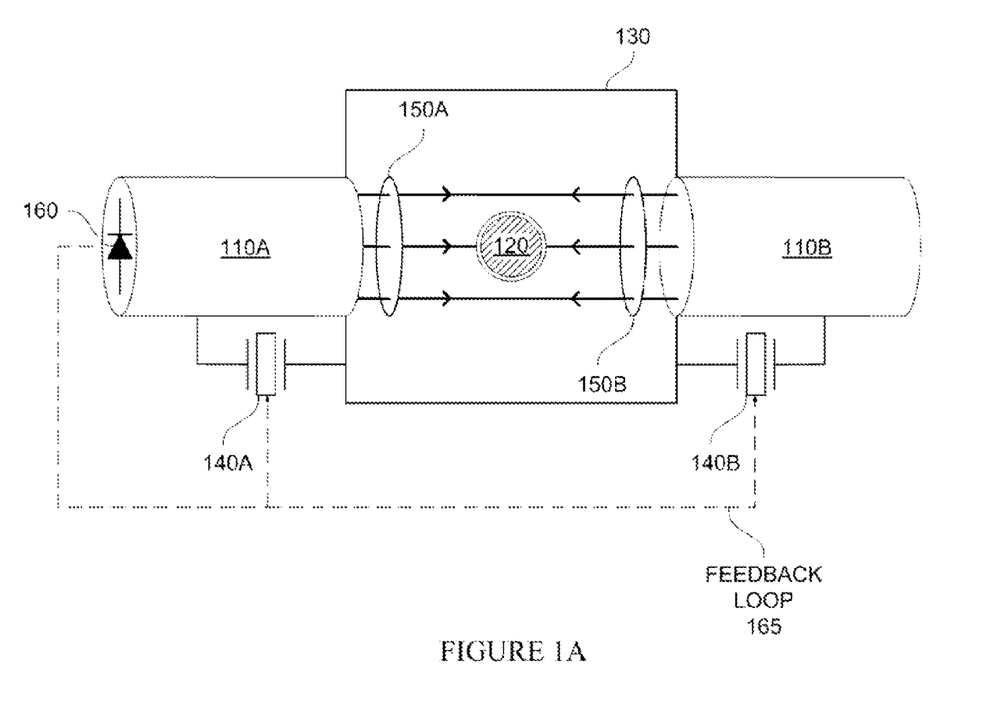
FIG. 1A is an inset diagram illustrating the double-sided exposure of a substrate.

FIG. 1A is an inset diagram of one pair of lasers 110A/B within holographic cell 100. For each axis, two in-phase lasers are required in each pair to illuminate opposite sides of the substrate 120. Thus, 14 lasers are required for a double-sided exposure of an RCD pattern. An advantage of double-sided exposure of a wire over two single-sided exposures is that there are no registration issues and there is no border between the images. Specifically, a holographic image is an interference pattern. Unlike traditional lithography, where multiple images may be stitched together, given good registration between the images; loss of a beam due to shadowing changes the pattern, creating large borders of bad images.

Pair of lasers 110A and 110B are interferometerically aligned to be in phase. Each laser directly illuminates the other: laser gain medium 110A, free space, laser gain medium 110B. Without precise phase alignment, the coherent beams destructively add, and output power quickly drops. The substrate 120 blocks some of the beam, but most of a round beam misses the wire, providing ample feedback for the interferometer. Piezoelectric actuators 140A and 140B precisely adjust the phase of lasers 110A and 110B respectively. Although only one actuator is needed to ensure phase alignment within the laser pair, two actuators are required per laser pair to maintain phase alignment of the beam within the holograph. With high beam count holograph, phase alignment is essential within the holograph. Back facet photodiode 160 monitors the beam power without disrupting the output beam, completing a feedback loop 165 to maximize beam power. Piezoelectric actuators 140 may be symmetrically adjusted, to minimize maximum phase deviation. Apodizers 150A and 150B maintain an even beam power, essential for uniform dimensions across the pattern of the holographic lithograph. Lasers 110 may be rod lasers, VSCELs, or any other type of laser. Depending on the type of laser, additional polarizers and collimators may be needed. Beam expanders may be used to expose a larger area of substrate. In an alternate embodiment, a single laser is split into 14 beams, each beam attenuated, retarded, and rotated as necessary, then delivered to the holograph. Alignment between the laser pairs is further illustrated in FIGS. 2 and 4.

Figure 2:
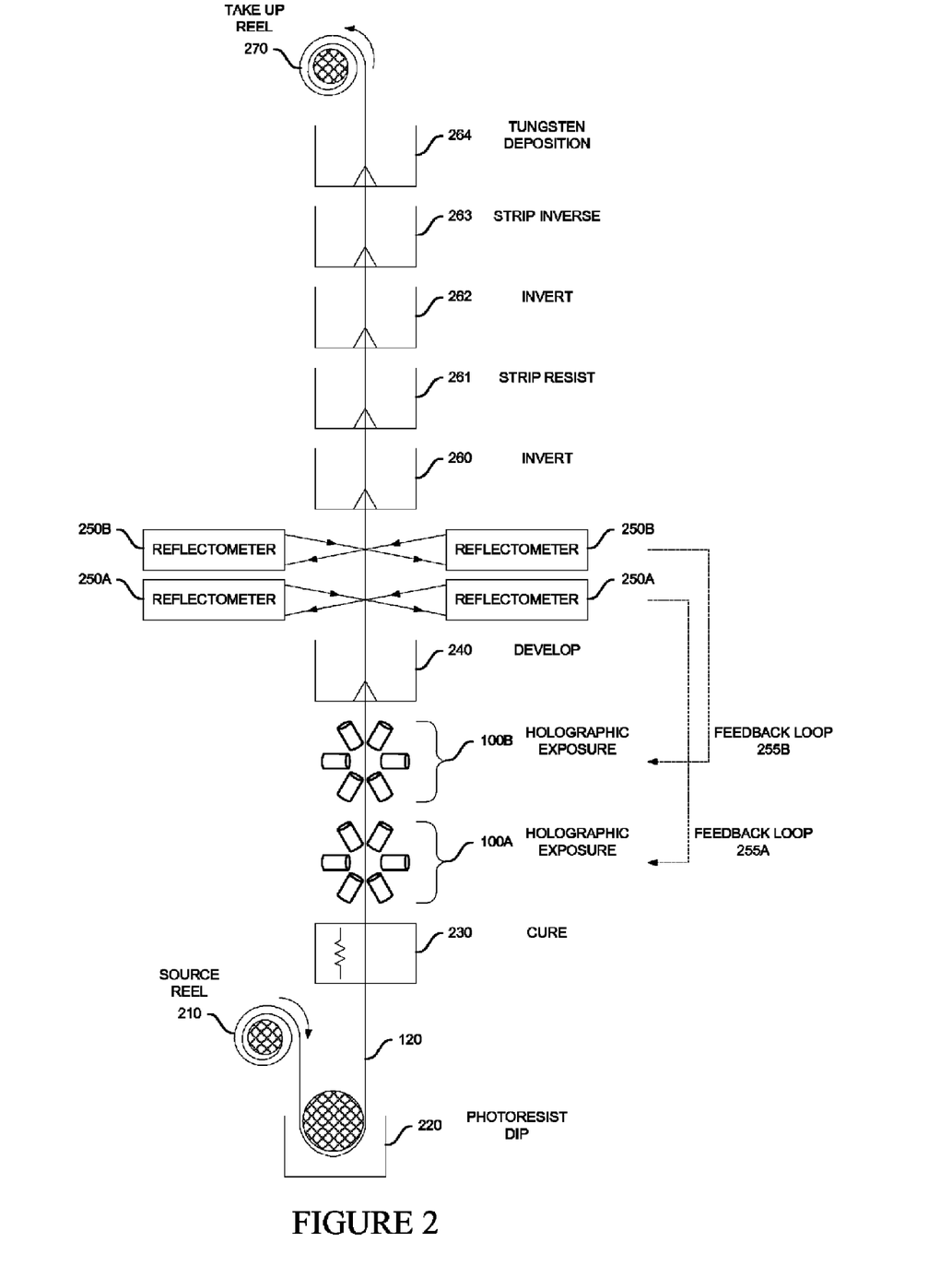
FIG. 2 is a diagram illustrating an apparatus to produce a PBG filament.

FIG. 2 is a diagram illustrating an apparatus for fabrication of PBG structures on a wire using reel-to-reel processing. A source of cleaned wire is taken off source reel 210 and dip coated in a photoresist bath 220 and the resist is soft baked in oven 230, resulting in a photosensitive coated substrate 120. The photoresist may be SU8 or any other photoresist exhibiting minimal refractive index change upon exposure. Holographic exposure cell 100 uses a multitude of lasers to create the holographic interference pattern within the photoresist. A RCD pattern is preferred for a wide band gap; however, other holographic patterns may be used. Multiple holographic exposure cells 100 AB have the advantage higher processing speed, exposing multiple frames at once. Only two are shown for illustrative purposes. Also, PBGs with different lattice constants may be produced along different segments of the same filament wire. Changing the PBG lattice constant, without changing the structure, is accomplished by varying the wavelength of the laser sources. This has the advantage of optimizing the color rendering of the resultant filament. Spacing between exposure cells 100A and 100B should be a non-integer number of frames to prevent multiple exposures. Substrate 120 is developed in a developer 240.

After holographic exposure, the substrate 120 is stepped and the process is repeated. After multiple steppings, the holographic template reaches set of reflectometers 250. The resultant reflection spectrum of the holographic template is then measured with a set of reflectometers 250. The set of reflectometers 250 may include multiple reflectometers, one for each crystallographic axis of the hologram. Two sets are shown only for illustrative purposes. A set of reflectometers 250 may be paired with each holographic exposure cell 100. Alternatively, a single reflectometer may be scanned across each axis and across each exposure. The measured reflectance spectra indicates if lasers 110-116A/B within holographic exposure cell 100 are properly aligned, as mis-alignment results in different structures, and thus different spectra. Alternatively, transmission spectra may be used if the substrate geometry and transmission characteristics allow. Small adjustments may then be made to the phase, amplitude, or polarization of the respective laser, completing the slow feedback loop 255. Feedback of measured parameters provides the advantage of effectively compensating for thermal and stability drifts within the holographic multiple-beam projection into a 3D physical space.

Initial calibration of the phase, amplitude, polarization, and position of each laser pair is accomplished using a test section of substrate 120, beginning with only two interfering beams and the analysis of the associated reflectance spectrum. Subsequent beams are then added, analyzed, and adjusted, building up to the 7 beam structure. Both the initial calibration adjustments and normal drift adjustments are applicable to both reel-to-reel processed wire substrates and to an alternate embodiment based on batch processed wafer substrates, further illustrated in FIG. 3.

The finished holographic template does not yet possess a 3D PBG, as it does not have sufficient dielectric contrast. The template is run through inversion cell 260, which forms a sacrificial volumetric inverse of the template by a well-known process, such as electrodeposition of a sacrificial material up through the interstitial voids, by CVD, by Atomic Layer Deposition, or by other process. The template is then removed in resist stripping cell 261. The inverse RCD is then run through inversion cell 262 and the first inversion material is stripped in cell 263. This results in a high dielectric contrast structure possessing a full 3D PBG. In another variation, the set of reflectometers 250 is moved to this location for enhanced measurement resolution. For a spectrally shaped incandescent emitter, an evaporation barrier is finally deposited over the PBG in Tungsten deposition cell 264. Before use as a filament, substrate 120 may be optionally removed leaving only the outer shell. This enables the use of very large diameter filaments while maintaining a resistivity high enough to be directly heated by standard line voltage. Large diameter filaments are important for long life light bulbs, as the larger diameter filaments more effectively recapture thermally evaporated metal. Wire tensioners, vibration dampers, and variable take ups are not shown for clarity. However, it should be noted that the process is a continuous process, except for the holographic exposure cell 100 and reflectometers 250, which continuously operate in a discrete time fashion, one complete frame at a time.

In an alternate embodiment, an inverse RCD pattern is holographically produced, and that pattern is inverted only once. Various materials may be selected for the PBG and for the diffusion barrier. For example, an incandescent emitter may employ a high temperature Copper or Silver alloy covered with a Tungsten evaporation barrier. Alternatively, a ceramic material, such as Titania or Alumina may eliminate the need for an evaporation barrier. Still other well-known materials may be used in each step. Yet another alternate embodiment uses a coiled wire substrate. A coiled substrate has the advantages of exposing a greater length of wire per exposure and of a reduced risk of handling damage of an already deposited PBG structure during coiling.

Figure 3:
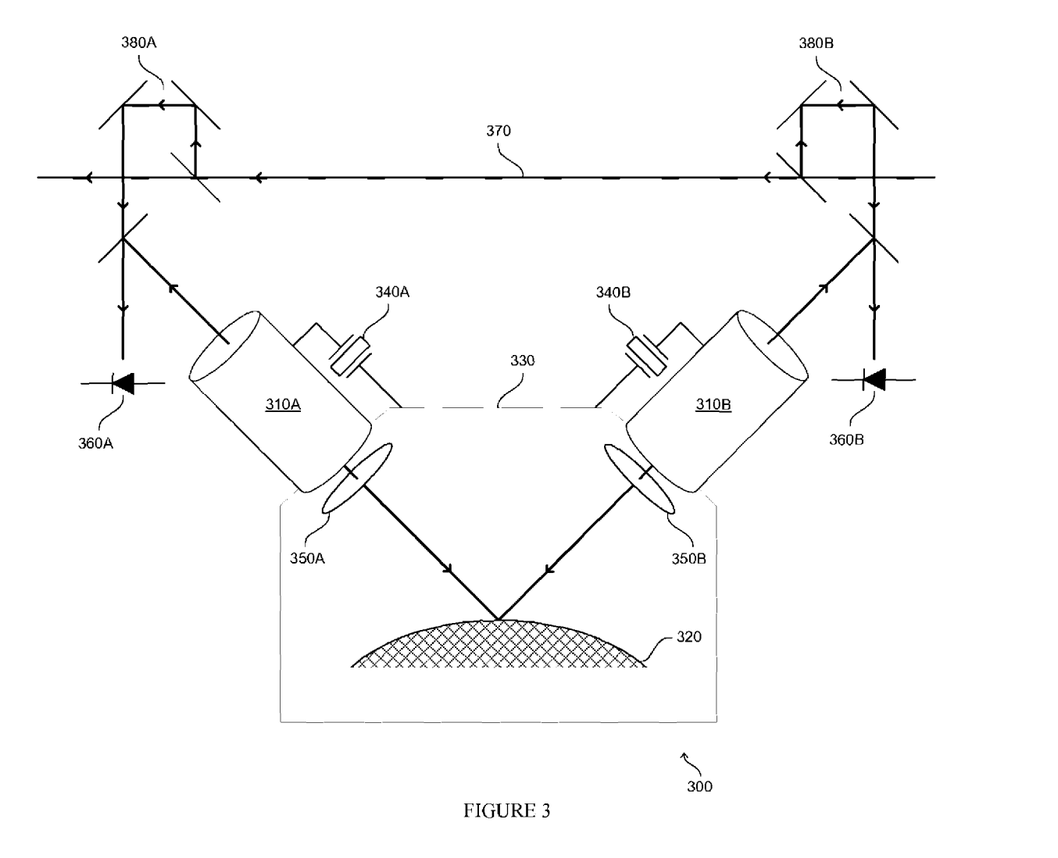
FIG. 3 is a diagram illustrating one embodiment of single-sided holographic exposure cell.

FIG. 3 is a diagram illustrating one embodiment of single-sided holographic exposure cell. Holographic cell 300 employs a multitude of lasers 310 A-G to produce a holographic RCD interference pattern in the volume of photoresist above substrate 320. Only 2 beams are shown for clarity. Substrate 320 may be curved, so long as the beam will not be shadowed due to the surface curvature. Alternatively, substrate 320 may be a transparent glass fiber, enabling production of double-sided filament structures without doubling the necessary number of lasers. A large cavity 330 contains a volume of index matching oil. While glass prisms are well known, their cost increases substantially with the number of beams and with coupling to a non-planar substrate. An advantage of an all oil index matching volume is that it is suited to easy adaptation to alternate size and shape substrates. Alternatively, a mix of glass and oil may be used. Piezoelectric actuators 340 A-G allow precise phase alignment between the beams, required for interference patterns created by more than 4 beams. Apodizers 350 A-G maintain an even beam power, essential for uniform dimensions of the holographic lithograph. The holographic exposure is further developed and forms a template for infiltration of a high dielectric material to form a PBG device.

Figure 4:
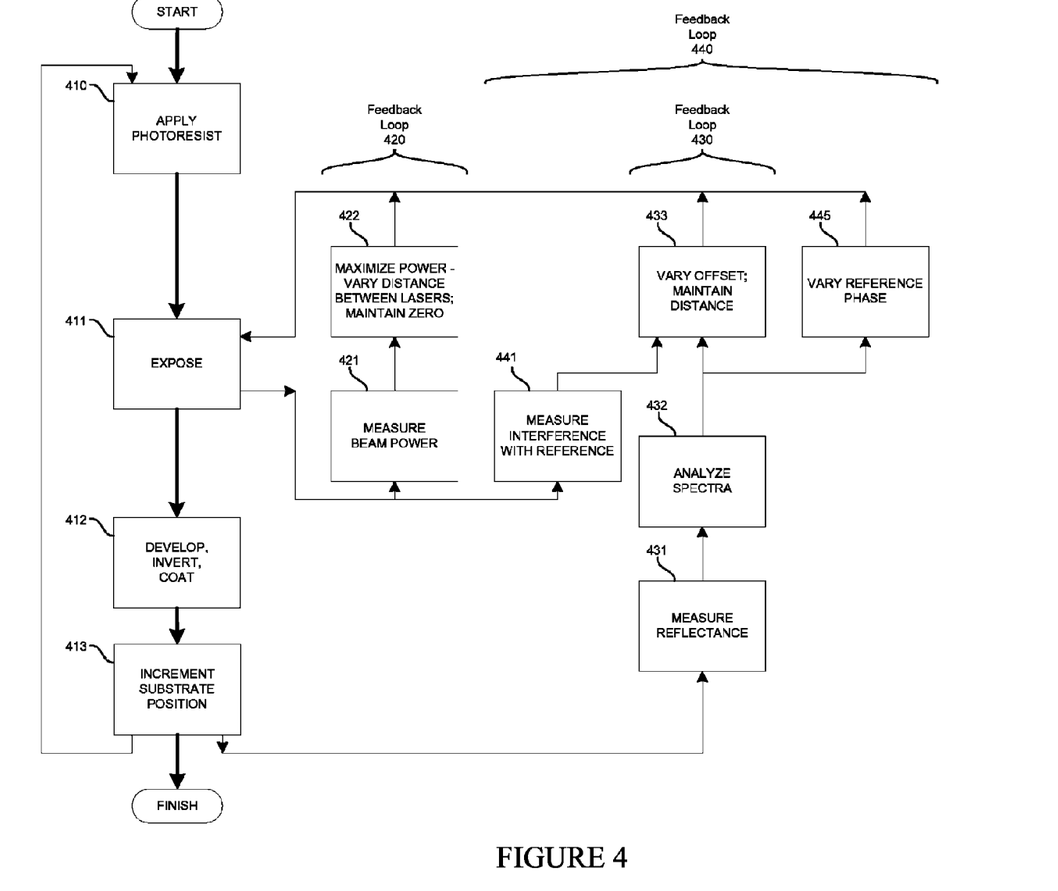
FIG. 4 is a flow diagram illustrating a holographic lithography method.

Alignment between the lasers may be accomplished with an adaptation of the apparatus described in FIG. 2 or method described in FIG. 4. This includes measurement of the reflectance spectra of a completed holograph, with this information fed back to adjust laser position. The aforementioned feedback loop 255 is a slow feedback loop. However, batch processing may introduce thermal variation to the optical system, thereby creating phase inaccuracies and degraded parts. Optionally, some of this thermal and vibrational positional variation may be compensated for with an interferometer. Reference beam 370 is split, its phase adjusted with variable delay line 380, rotated, combined in phase, and detected with detector 360. After the lasers are aligned and producing the desired structure as described in association with FIGS. 2 and 4, delay lines 380 are adjusted to produce minimum power at detector 360. Subsequent perturbations will be detected as an increase in power at detector 360, and may be minimized by adjusting actuator 340. This fast feedback loop operates within the exposure time of a single frame. Periodically, delay lines 380 may be recalibrated by slow feedback loop 255.

Optionally, these holographic templates may be further processed into waveguides, filters, and splitters for optical signal processing and optical computing applications by addition of defects in the PBG structure. Additive defects may be introduced by scanning a laser along the desired defect path, preferably from different axes. This further exposes and hardens the photoresist in the selected area, which is then developed and processed into a PBG. Negative defects may be introduced by creating a metallic inverse structure, infiltrating the structure with a second photoresist, selectively scanning the desired pattern, developing, then performing the second inversion and removal of the inverse structure. Particularly, when using a second photoresist, a two photon polymerization process is desired for the highest resolution without impact to the template. These volumetrically produced defective structures are much more economical to manufacture than producing defects in a layer-by-layer process.

FIG. 4 is a flow diagram illustrating a holographic method. Starting with a substrate, a lithographic photoresist is applied in step 410, the photoresist is exposed to a holographic interference pattern in step 411. The exposure for a RCD pattern on a wire substrate requires the interference of 14 lasers to create a volumetric hologram. Other patterns are readily envisioned by changing the number, orientation, amplitude, phase, and polarization of these lasers. The pattern is developed, inverted to create a PBG structure, and coated to create a filament for a light source in step 412. The substrate is incremented for continuous processing or exchanged for batch processing in step 413, resulting in a finished PBG structure. The process is repeated for the next frame of holographic processing.

Maintaining laser alignment is essential to produce a useful pattern. This is accomplished with 3 feedback loops running simultaneously with the PBG fabrication flow. Feedback loop 420 is omitted when processing a single-sided substrate. For double-sided exposure of a substrate, exposure step 411 includes two lasers directly illuminating each other in phase, forming an interferometer, with a substrate between a portion of the beam area. Thus, the power from the laser pair adds constructively. This power is measured in step 421, and the distance between the laser pair is adjusted a few nanometers to maximize beam power in step 422. This fast feedback loop is run during exposure step 411 and is repeated for each pair of lasers.

Feedback loop 430 measures the reflectance spectrum of the finished PBG structure to determine if each of the beams is properly phased in exposure 411. The structure must be processed into a finished PBG in step 412, since there is no contrast between exposed and unexposed regions. Thus, significant delay time exists between exposure and measurement of the reflectance spectra in step 431. The reflectance spectrum is analyzed in step 432. The result is an adjustment to the position of the laser, without varying the distance between paired lasers, in step 433. This is repeated for each beam and crystallographic axis. This feedback executes concurrently with PBG fabrication, once per frame, delayed by the time required to process the exposure into a PBG.

Optional feedback loop 440 is useful to detect excessive vibration during exposure and for fast phase adjustment between beams, such as to compensate for thermal expansion due to exchange of substrates during a batch process. Loop 440 is not required for continuous processing operating under isothermal conditions. A reference beam is added to loop 430 to provide fast feedback of the phase of each holographic laser. An output is added to loop 430 to vary the phase of a reference beam provided to each of the holographic lasers in step 445. Step 441 interferometerically measures the phase difference of each laser to a reference beam. The position of the laser is adjusted a few nanometers in step 433, completing a fast feedback loop. This portion of the feedback loop is run simultaneously during exposure step 411 and is repeated for each pair of lasers.

Although embodiments of the system and method of the present invention have been illustrated in the accompanying drawings and described in the foregoing detailed description, it will be understood that the invention is not limited to the embodiments disclosed, but is capable of numerous rearrangements, modifications, and substitutions without departing from the spirit of the invention as set forth and defined by the following claims.

What is claimed is:

1. A porous crystalline structure produced by the following process:
   providing a non-planar substrate;
   application of a lithographic photoresist to non-planar areas of said substrate to be exposed;
   performing a series of stitched volumetric holographic exposures of said photoresist;
   where a multitude of interfering laser beams overlap in said photoresist to form a volumetric hologram; and
   development of said photoresist.

2. The porous structure of claim 1, where said substrate is a length of wire.

3. The porous structure of claim 2, where said wire is permanently coiled prior to said holographic exposure.

4. The porous structure of claim 1, where said substrate is a glass fiber.

5. The porous structure of claim 1, where said structure is transformed into a photonic crystal, and said substrate is removed.

6. The porous structure of claim 1, where each of said multitude of laser beams further includes coupled pairs of laser beams;
   wherein the beams of each pair overlap;
   where said coupling is in phase; and
   said substrate is located between said pair of laser beams.

7. The porous structure of claim 6, where a distance between each said laser beam in each said pair of laser beams is adjusted in a closed loop fashion to maximize incident power.

8. The porous structure of claim 6, where the substrate has multiple sides incapable of being simultaneously fully illuminated by a single laser beam, and
   where said multiple sides are simultaneously exposed to said volume holograph by said pairs of beams.

9. The porous structure of claim 6, where each of said laser beams is produced with a separate laser.

10. The porous structure of claim 1, where said structure is transformed into a photonic crystal structure possessing a high contrast of dielectric constant;
    said photonic crystal is packaged, and
    where said packaged photonic crystal is directly resistively heated to emit visible light.

11. The porous structure of claim 1, where said holographic exposure is of a rod connected diamond lattice.

12. An apparatus to produce a porous crystalline structure including:
    a non-planar substrate;
    a means to cover non-planar areas of said substrate to be exposed with a lithographic photoresist;
    a means to volumetrically holographically expose a photonic crystal in said photoresist;
    a means to translate said non-planar substrate;
    a means to develop said photoresist; and
    a means to transform said porous photoresist into a photonic crystal structure.

13. The apparatus of claim 12, where said substrate includes a wire substrate permanently coiled prior to said holographic exposure.

14. The apparatus of claim 12, further including:
    a means to vary the lattice constant of said holographic exposure between repetitions of said holographic exposures.

15. The apparatus of claim 12,
    where said holographic exposure means includes a pair of laser beams per holographic axis;
    wherein the beams of each pair overlap and are coupled to each other in phase; and
    where said photoresist is located between said pair of beams.

16. The apparatus of claim 15, where said holographic exposure is of a rod connected diamond lattice; and
   where said means to define said hologram includes 14 laser beams forming 7 said pairs of laser beams.

17. The apparatus of claim 12, further including a means to package said photonic crystal, and
   a means to directly heat said packaged photonic crystal structure.

18. A method for holographic lithography including:
   providing a non-planar substrate;
   covering non-planar areas of said substrate to be exposed with a photoresist;
   performing a series of stitched volumetric holographic exposure of said photoresist;
   development of said photoresist.

19. The method of claim 18, further includes an interferometric method of alignment of laser beams producing said holographic exposure including:
   a pair of laser beams located along each holographic axis;
   each laser beam of said pair of lasers beams overlap each other;
   where said photoresist is positioned in said region of beam overlap;
   where the distance between said laser beams is tuned for maximum power.

20. The method of claim 18, further including:
   measurement of the relative phase between laser beams comprising said holographic exposure; and
   feedback control of the position of said laser beams to maintain a constant relative phase.

21. The method of claim 18, where said non-planar substrate is a wire.

22. The method of claim 21, where a multitude of said holograms of varying lattice constant are produced on said substrate.

23. The method of claim 18, where said hologram possesses a gyroid lattice structure.

24. The method of claim 18, where said hologram is a pattern of a photonic crystal structure,
   further including:
   transforming said hologram into a photonic crystal,
   packaging said photonic crystal, and
   directly heated said packaged photonic crystal to visibly incandesce.

25. The method of claim 18, where said holographic exposure is further exposed to create patterns of defects.

26. The method of claim 18, further including:
   measuring the reflectance of said photonic crystal;
   said measurement is analyzed;
   said analysis is fed back to correct errors of laser beams producing said holographic exposure.

* * * * *